(No Model.)

J. A. COULTAUS.
BOLT.

No. 347,996. Patented Aug. 24, 1886.

WITNESSES:
John M. Deemer
C. Sedgwick

INVENTOR:
J. A. Coultaus
BY Munn & Co.
ATTORNEYS.

UNITED STATES PATENT OFFICE.

JOSEPH A. COULTAUS, OF BROOKLYN, NEW YORK, ASSIGNOR TO HIMSELF, DANIEL M. ROLLINS, AND ALICE W. ROLLINS, ALL OF SAME PLACE.

BOLT.

SPECIFICATION forming part of Letters Patent No. 347,996, dated August 24, 1886.

Application filed October 23, 1885. Serial No. 180,768. (No model.)

*To all whom it may concern:*

Be it known that I, JOSEPH A. COULTAUS, of Brooklyn, in the county of Kings and State of New York, have invented a certain new and Improved Rivet or Bolt, of which the following is a specification.

My invention relates more particularly to that class of rivets or bolts employed for the purpose of mounting caster-rollers within the forked arms of the body of the caster, although the bolt is applicable to many other uses in the mechanic arts.

The invention consists, essentially, of a bevel-faced feather, which extends from the outer edge of the head of the bolt or rivet diagonally downward toward the shank of the rivet.

Reference is to be had to the accompanying drawings, forming a part of this specification, in which similar letters of reference indicate corresponding parts in all the figures.

Figure 1:
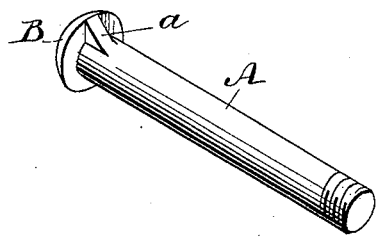
Figure 2:
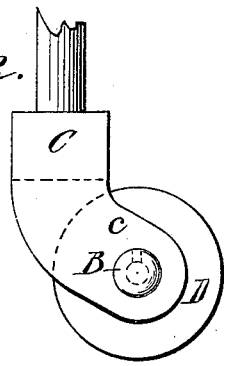
Figure 3:
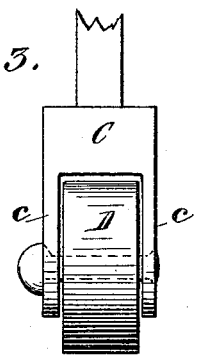
Figure 4:
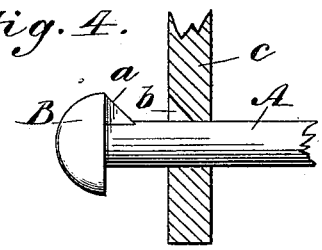

Figure 1 is a perspective view of my improved form of bolt. Fig. 2 is a side view of a portion of a caster wherein the roller is secured by such a bolt as is illustrated in Fig. 1. Fig. 3 is a face view of a similar caster, the bolt being represented as being riveted in place; and Fig. 4 is a side view of the head of the bolt, together with its beveled feather and a portion of the shank, the bolt being shown in connection with a portion of one of the arms of the caster.

A represents the body or shank of the bolt or rivet, upon which there is, as usual, formed a head, B. A feather, a, is formed upon the shank A and the head B, the face of said feather projecting at an angle, preferably of forty-five degrees from the shank to the outer edge of the head B. The headless end of the shank A may be screw-threaded to engage with a nut, or formed without a thread when the device is to be riveted in place.

In Figs. 2 and 3 I illustrate my improved form of bolt as it is used in connection with a caster, C, having arms c c, and a roller, D, which is held in place by the bolt or rivet A, one of the arms C being formed with a groove, b, to admit the feather a, and the bolt being held in place by a nut, or being riveted in position, as shown in Fig. 3.

The advantage arising from the use of such a bolt or rivet as has been described, is that when applied to a metallic arm in which a round hole has been formed, the groove b within which the feather is to rest, may be made by a single tap of a hammer upon a chisel applied to the metallic arm, which tap will cut away a small piece or portion of the metal and leave a beveled groove within which the feather will fit, whereas with the ordinary form of feather having a face parallel with the shank of the bolt considerable trouble is always experienced in forming a groove for the feather to rest in, it being necessary to cut a groove to correspond with the form of the feather, which involves considerable time, labor, and expense; but with my arrangement the groove can be cut in an instant with a chisel, as stated, or by means of a milling-tool, whereas with the old form of parallel-faced feather a milling-tool could not be used to form the groove.

When the rivet or bolt is to be used in connection with a wooden arm or part, the groove may be formed by tapping the head of the bolt and driving the feather directly into the wood.

This form of bolt is designed more particularly for use in casters where it is desirable that the bolt be held from turning within the apertures formed in the arms of the caster, thus preventing all wear upon the metallic parts, and increasing the friction between the bolt and the wooden-cored roller which is sometimes employed in such casters.

I am aware that bolts or rivets have heretofore been made with flanges having faces that are parallel with the shank of the bolt or rivet, and such construction I do not claim, my idea being to provide a feather for which a groove may be made by a single stroke of the hammer upon a proper tool applied to the part within which the shank of the rivet is to rest.

Having thus fully described my invention, what I claim as new, and desire to secure by Letters Patent, is—

As an improved article of manufacture, a bolt or rivet made as herein shown and described, with a bevel-faced feather, the bevel of which extends from the face of the bolt-shank to the inner face of the head thereof, substantially as set forth.

JOSEPH A. COULTAUS.

Witnesses:
EDWARD KENT, Jr.,
C. SEDGWICK.